US012214309B2

(12) United States Patent
Huskisson

(10) Patent No.: US 12,214,309 B2
(45) Date of Patent: Feb. 4, 2025

(54) PASSIVE DUST FILTER FOR AN INSPECTION HATCH

(71) Applicant: Benetech, Inc., Aurora, IL (US)

(72) Inventor: Robert Huskisson, Oconomowoc, WI (US)

(73) Assignee: Benetech, Inc., Aurora, IL (US)

( * ) Notice: Subject to any disclaimer, the term of this patent is extended or adjusted under 35 U.S.C. 154(b) by 460 days.

(21) Appl. No.: 17/714,273

(22) Filed: Apr. 6, 2022

(65) Prior Publication Data

US 2022/0314157 A1   Oct. 6, 2022

Related U.S. Application Data

(60) Provisional application No. 63/171,354, filed on Apr. 6, 2021, provisional application No. 63/171,338, filed on Apr. 6, 2021.

(51) Int. Cl.
*B01D 53/22* (2006.01)
*B01D 46/00* (2022.01)
(Continued)

(52) U.S. Cl.
CPC ......... *B01D 46/71* (2022.01); *B01D 46/0005* (2013.01); *B01D 46/0049* (2013.01); *B01D 46/0086* (2013.01); *B01D 46/04* (2013.01); *B01D 46/24* (2013.01); *B01D 46/442* (2013.01); *B01D 46/521* (2013.01); *B01D 46/58* (2022.01); *B01D 47/06* (2013.01); *B01D 46/2411* (2013.01); *B01D 50/60* (2022.01); *B01D 2273/30* (2013.01)

(58) Field of Classification Search
CPC .... B01D 46/71; B01D 46/58; B01D 46/0005; B01D 46/0049; B01D 46/0086; B01D 46/04; B01D 46/24; B01D 46/442; B01D 46/521; B01D 47/06; B01D 50/60; B01D 46/2411; B01D 2273/30
See application file for complete search history.

(56) References Cited

U.S. PATENT DOCUMENTS

| 1,047,866 A | 12/1912 | Weller |
| 1,336,546 A | 4/1920 | Wall |

(Continued)

FOREIGN PATENT DOCUMENTS

| AU | 2005324346 A1 | 7/2006 |
| AU | 2005324346 B2 | 3/2011 |

(Continued)

OTHER PUBLICATIONS

US 11,091,332 B2, 08/2021, Lucas et al. (withdrawn)

*Primary Examiner* — Anthony R Shumate
(74) *Attorney, Agent, or Firm* — Richard C. Himelhoch; UB Greensfelder LLP

(57) ABSTRACT

The invention is directed to a passive dust filtering system for an inspection hatch of steel bulk storage vessel. The system includes a filter containment unit and an adaptor section for securing the unit to the storage vessel. The adaptor section includes a mounting flange having one or more magnetic switches to engage the storage vessel. A purge control system is used to periodically pulse air into filter elements in the filter containment unit to blow dust from the outside of the filter elements back into the vessel.

20 Claims, 7 Drawing Sheets

(51) Int. Cl.
  *B01D 46/04* (2006.01)
  *B01D 46/24* (2006.01)
  *B01D 46/44* (2006.01)
  *B01D 46/52* (2006.01)
  *B01D 46/58* (2022.01)
  *B01D 46/71* (2022.01)
  *B01D 47/06* (2006.01)
  *B01D 50/60* (2022.01)

(56) References Cited

U.S. PATENT DOCUMENTS

| | | |
|---|---|---|
| 1,400,658 A | 12/1921 | Brown |
| 1,524,334 A | 1/1925 | Brown |
| 1,789,069 A | 1/1931 | Gove |
| 1,791,371 A | 2/1931 | Onstad |
| 1,800,920 A | 4/1931 | Wilson et al. |
| 1,814,619 A | 7/1931 | Carter |
| 1,896,149 A | 2/1933 | Zademach |
| 2,219,226 A | 10/1940 | Gerber |
| 2,249,588 A | 7/1941 | Waddle |
| 2,859,873 A | 11/1958 | Bresee |
| 3,248,018 A | 4/1966 | Fleischman |
| 3,259,078 A | 7/1966 | Radey et al. |
| 3,344,909 A | 10/1967 | Hansen et al. |
| 3,568,819 A | 3/1971 | Mann |
| 3,858,733 A | 1/1975 | Morioka et al. |
| 3,926,290 A | 12/1975 | Isojima et al. |
| 4,039,062 A | 8/1977 | Carre et al. |
| 4,123,334 A | 10/1978 | Emery |
| 4,164,327 A | 8/1979 | Clark |
| 4,177,736 A | 12/1979 | Przybylinski et al. |
| 4,182,591 A | 1/1980 | Stanelle |
| 4,277,214 A | 7/1981 | Mahle et al. |
| 4,363,350 A | 12/1982 | Beckerer |
| 4,371,305 A | 2/1983 | Pannell |
| 4,489,862 A | 12/1984 | Diem |
| 4,552,573 A | 11/1985 | Weis et al. |
| 4,598,823 A | 7/1986 | Swinderman |
| 4,603,769 A | 8/1986 | Bach et al. |
| 4,623,056 A | 11/1986 | Flaugher |
| 4,632,681 A * | 12/1986 | Brunner .......... B01D 46/71 55/508 |
| 4,643,293 A | 2/1987 | Swinderman |
| 4,721,425 A | 1/1988 | Strocker |
| 4,775,267 A | 10/1988 | Yamamoto |
| 4,821,861 A | 4/1989 | Shanahan |
| 4,867,353 A | 9/1989 | Jacek |
| 4,877,125 A | 10/1989 | Gordon |
| 4,878,576 A | 11/1989 | Dietzen |
| 4,946,018 A | 8/1990 | Binzen et al. |
| 5,016,686 A | 5/1991 | Gerstenkorn |
| 5,024,319 A | 6/1991 | Dixon et al. |
| 5,048,669 A | 9/1991 | Swinderman |
| 5,123,542 A | 6/1992 | Hoppe |
| 5,154,271 A | 10/1992 | Binzen |
| 5,154,280 A | 10/1992 | Mott |
| 5,160,222 A | 11/1992 | Noland |
| 5,190,132 A | 3/1993 | Stanelle et al. |
| 5,248,344 A | 9/1993 | Hoppe |
| 5,291,988 A | 3/1994 | Leonard |
| 5,368,192 A | 11/1994 | Ransom, II |
| 5,372,229 A | 12/1994 | Leibling |
| 5,441,321 A | 8/1995 | Karpisek |
| 5,673,779 A | 10/1997 | Spickelmire |
| 5,685,416 A | 11/1997 | Bonnet |
| 5,697,375 A | 12/1997 | Hickey |
| 5,697,408 A | 12/1997 | Reeves |
| 5,769,573 A | 6/1998 | Faas et al. |
| 5,800,112 A | 9/1998 | Stafford |
| 5,806,324 A | 9/1998 | Shaw |
| 5,993,117 A | 11/1999 | Lancaster et al. |
| 5,996,171 A * | 12/1999 | Bowers .......... B01D 50/20 15/340.1 |
| 6,019,147 A | 2/2000 | Prescott et al. |
| 6,041,907 A | 3/2000 | Bonnette |
| 6,102,195 A | 8/2000 | Weikel |
| 6,315,159 B1 | 11/2001 | Paczkowski |
| 6,575,294 B1 | 6/2003 | Swinderman et al. |
| 6,578,694 B2 | 6/2003 | Harris et al. |
| 6,681,921 B1 | 1/2004 | Schroeder |
| 6,763,935 B2 | 7/2004 | Ostman |
| 6,827,025 B2 | 12/2004 | Gaydos et al. |
| 6,921,037 B2 | 7/2005 | Wysong et al. |
| 7,000,758 B2 | 2/2006 | Bjorklund |
| 7,003,850 B2 | 2/2006 | Gaydos et al. |
| 7,028,629 B2 | 4/2006 | Walcome |
| 7,036,647 B2 | 5/2006 | Malmberg |
| 7,228,956 B2 | 6/2007 | Pircon et al. |
| 7,258,228 B1 | 8/2007 | Herren |
| 7,364,034 B1 | 4/2008 | Clark et al. |
| 7,438,171 B1 | 10/2008 | Clark et al. |
| 7,464,661 B2 | 12/2008 | Baas et al. |
| 7,484,617 B1 | 2/2009 | Flood, Jr. et al. |
| 7,571,802 B2 | 8/2009 | Bowman |
| 7,735,620 B2 | 6/2010 | Swinderman |
| 7,743,927 B2 | 6/2010 | Svatek et al. |
| 7,855,343 B2 | 12/2010 | Nakagawa et al. |
| 7,958,992 B1 | 6/2011 | Stier |
| 8,006,830 B2 | 8/2011 | Swinderman |
| 8,319,122 B2 | 11/2012 | Kishikawa et al. |
| 8,607,964 B2 | 12/2013 | Kheifets |
| 8,727,108 B2 | 5/2014 | Dekoning |
| 8,800,756 B2 | 8/2014 | Pircon et al. |
| 8,960,419 B2 | 2/2015 | Kennedy et al. |
| 8,967,357 B2 | 3/2015 | Houssian et al. |
| 9,598,248 B2 | 3/2017 | Raiche |
| 9,919,938 B2 | 3/2018 | Soane et al. |
| 10,024,114 B2 | 7/2018 | Vandapel et al. |
| 10,035,669 B2 | 7/2018 | Harris et al. |
| 10,059,635 B2 | 8/2018 | Hay et al. |
| 10,246,265 B2 | 4/2019 | Schnitkey |
| 10,633,201 B2 | 4/2020 | D'Agostino et al. |
| 10,676,294 B2 | 6/2020 | Harrenstein et al. |
| 10,752,443 B1 | 8/2020 | Lwali et al. |
| 10,766,709 B2 | 9/2020 | Smith |
| 10,926,967 B2 | 2/2021 | Oren et al. |
| 11,027,932 B2 | 6/2021 | Harris |
| 11,066,259 B2 | 7/2021 | Warren et al. |
| 11,136,207 B2 | 10/2021 | Pircon et al. |
| 11,192,731 B2 | 12/2021 | Lucas et al. |
| 11,261,030 B2 | 3/2022 | Geysen |
| 11,273,994 B2 | 3/2022 | Huskisson et al. |
| 11,319,171 B2 | 5/2022 | Harris et al. |
| 11,332,328 B2 | 5/2022 | Harris et al. |
| 2003/0172630 A1* | 9/2003 | Thornwesten, Sr. .. B01D 46/24 55/312 |
| 2004/0031666 A1 | 2/2004 | Ostman |
| 2006/0151280 A1 | 7/2006 | Pircon et al. |
| 2010/0072035 A1 | 3/2010 | Brody et al. |
| 2010/0263344 A1* | 10/2010 | Haynam .......... B01D 46/2414 55/502 |
| 2012/0189940 A1* | 7/2012 | Richards .......... H01M 8/249 29/897.3 |
| 2012/0304860 A1* | 12/2012 | Matson .......... B01D 46/02 55/367 |
| 2014/0054140 A1 | 2/2014 | Pircon et al. |
| 2014/0190356 A1* | 7/2014 | Barrett .......... B01D 46/0004 55/505 |
| 2016/0059168 A1* | 3/2016 | Bataille .......... B65G 69/182 96/416 |
| 2016/0121252 A1* | 5/2016 | Esswein .......... B01D 46/02 29/428 |
| 2018/0134507 A1 | 5/2018 | Lucas et al. |
| 2018/0162643 A1 | 6/2018 | Delmoni |
| 2018/0178999 A1 | 6/2018 | Sherwood et al. |
| 2018/0251306 A1 | 9/2018 | Geysen |
| 2018/0319585 A1* | 11/2018 | Bataille .......... B65D 88/30 |
| 2020/0062513 A1 | 2/2020 | Hutchison et al. |
| 2020/0354174 A1 | 11/2020 | Harris et al. |
| 2020/0354175 A1 | 11/2020 | Harris et al. |
| 2021/0053781 A1 | 2/2021 | Pircon et al. |
| 2021/0188564 A1 | 6/2021 | Rutkevicius et al. |
| 2021/0261355 A1 | 8/2021 | Huskisson et al. |

(56) References Cited

U.S. PATENT DOCUMENTS

| | | |
|---|---|---|
| 2021/0339966 A1 | 11/2021 | Lucas et al. |
| 2022/0024707 A1 | 1/2022 | Pircon et al. |
| 2022/0073368 A1* | 3/2022 | Smith .................... B01D 63/16 |
| 2022/0080479 A1 | 3/2022 | Baker et al. |
| 2022/0106106 A1 | 4/2022 | Holmes et al. |
| 2022/0135336 A1 | 5/2022 | Geysen |
| 2022/0347615 A1* | 11/2022 | Rousseau ............... B01D 46/58 |

FOREIGN PATENT DOCUMENTS

| | | | |
|---|---|---|---|
| CA | 2594426 | A1 | 7/2006 |
| CA | 2594426 | C | 5/2013 |
| CN | 2146460 | Y | 11/1993 |
| CN | 101175679 | A | 5/2008 |
| CN | 101175679 | B | 12/2011 |
| DE | 1531910 | A1 | 1/1970 |
| DE | 2404157 | A1 | 7/1975 |
| DE | 2927316 | B1 | 2/1980 |
| DE | 3023898 | A1 | 1/1982 |
| EP | 0062769 | A1 | 10/1982 |
| EP | 0369605 | A1 | 5/1990 |
| EP | 0584441 | A1 | 3/1994 |
| EP | 1129965 | A2 | 9/2001 |
| EP | 1836112 | B1 | 4/2012 |
| FR | 2207074 | A1 | 6/1974 |
| ID | P025168 | B | 2/2010 |
| JP | S5747123 | A | 3/1982 |
| JP | 2534253 | Y2 | 4/1997 |
| JP | 10305907 | A | 11/1998 |
| JP | 2008526652 | A | 7/2008 |
| JP | 5393983 | B2 | 1/2014 |
| KR | 19850005816 | A | 9/1985 |
| KR | 1020070106996 | A | 11/2007 |
| KR | 100908762 | B1 | 7/2009 |
| KR | 1020100120555 | A | 11/2010 |
| KR | 1020110056815 | A | 5/2011 |
| KR | 1020130050738 | A | 5/2013 |
| KR | 1020150125068 | A | 11/2015 |
| KR | 1020160056698 | A | 5/2016 |
| LU | 70952 | A1 | 3/1975 |
| MX | 269719 | | 9/2009 |
| NL | 7803864 | A | 10/1978 |
| RU | 2007130548 | A | 2/2009 |
| RU | 2389673 | C2 | 5/2010 |
| WO | 2006076140 | A2 | 7/2006 |
| WO | 2014031188 | A1 | 2/2014 |
| WO | 2021035041 | A1 | 2/2021 |
| WO | 2021167943 | A1 | 8/2021 |
| WO | WO-2023205897 A1 * | | 11/2023 |
| ZA | 200705630 | | 7/2008 |

* cited by examiner

PASSIVE DUST FILTER FOR AN INSPECTION HATCH

CROSS-REFERENCE TO RELATED APPLICATIONS

The present invention claims priority to and the benefit of U.S. Provisional Patent Application No. 63/171,338 filed Apr. 6, 2021 and U.S. Provisional Patent Application No. 63/171,354, the contents of which are incorporated herein by reference and made a part hereof.

The present application also relates to co-pending U.S. Utility patent application Ser. No. 17/714,285, entitled "Dust Filter for Integration with a Conveyor Skirting System," filed concurrently herewith, the contents of which are incorporated herein by reference.

FEDERALLY SPONSORED RESEARCH OR DEVELOPMENT

N/A

FIELD OF THE INVENTION

The present invention is directed toward a passive dust filtering system that can be magnetically connected to a hatch of a steel storage vessel.

DESCRIPTION OF THE PRIOR ART

Dust is a persistent problem associated with moving and storing dry bulk materials, such as coal and other mining materials, fertilizer, paper and wood products, and a large range of other materials. Not only is dust a health and safety issue, it can damage the machinery used for transporting the material requiring expensive equipment maintenance and repair. Dust can also cause environmental issues and can be a combustion risk.

In view of the numerous problems associated with dust generated by the bulk materials, a number of industries are heavily regulated, requiring companies in such industries to implement compliance measures. Efficient, cost-effective measures are needed to provide such compliance, and to ensure a safe work environment.

The present invention provides a filtering system that can be used on an open hatch of a dry bulk bin vessel to prevent dust from escaping through the hatch.

SUMMARY OF THE INVENTION

The present invention is directed to a passive dust filtering system for an inspection hatch (or other type of hatch) associated with a steel, dry bulk storage vessel or tank. The filtering system is designed to capture dust generated during loading of aggregate material from a trailer to the bulk storage vessel. The dust filtering system includes a filter containment unit that can be easily connected to an open hatch frame on the vessel. The filter containment unit acts as an enclosure for a plurality of filter elements. Preferably, the filter elements have a cylindrical shape and are open at one end.

The system captures displaced air exiting the hatch through the filter elements. As the filter elements continue to capture dust, they can be periodically pulsed with compressed air to allow the captured dust (on the outer surfaces of the filter elements) to be expelled and deposited back through the hatch into the bulk storage vessel. The filter containment unit is designed to be light weight, portable, re-useable and self-cleaning.

The filter containment unit of the dust filtering system includes an inlet adapter section for attaching the system to various hatch types, sizes and shapes. The adapter section is connected to the bottom of the containment unit. The adapter section includes a mounting flange containing a gasket to insure an airtight seal between the flange and the top of the hatch of the steel bulk storage tank. The flange is secured to the steel tank utilizing magnetic switch brackets which allow the magnets to be turned "on" to secure the unit to the tank, or "off" to remove the unit. No tools are needed to attach or remove the unit.

The filter containment unit includes a main body defined by a plurality of side walls, and a lid hingedly attached to the main body. The plurality of filters elements are supported in an interior chamber of the main body by a divider plate that separates the chamber into a clean air plenum on the side having the lid, and an exposed area which is in communication with contents of the tank. The unit includes a differential pressure switch that will measure the air pressure across the filter elements (from the exposed area to the clean air plenum). The unit also includes a manifold connected to a supply of compressed air in a reservoir tank. The manifold includes diaphragm valves positioned over each of the filter elements. When the differential pressure valve reaches a set point, a purge circuit is activated, causing the diaphragm valves to activate and pulse the filter elements with compressed air. A capacitive discharge control circuit (or other similar control system) can be used to regulate the sequence, timing and duration of the pulse cycle.

During normal operation, dust laden air enters the filter containment unit through the bottom adapter section attached to the tank about the hatch. As the dust laden air passes through the filters, dust is collected on the outer filter surface of the filter elements and clean air is passed into the clean air plenum through the middle of the filter element. The clean air can exit the containment unit through a vent or duct, which can be incorporated into the lid. As the outside of the filter surfaces becomes laden with dust, the differential pressure between the filter inlet and outlet increases to a set point (which is defined in the differential pressure switch). This results in a compressed air pulse inside the filter elements that forces the dust off the outside surfaces, allowing it to drop back through the hatch into the dry bulk storage tank.

The filter containment unit can include a dust detection sensor in the clean air plenum to measure the presence of dust in the air. The sensor acts as a contamination indicator that verifies whether the filter elements are damaged. In the event the sensor detects contamination, an alarm can be triggered to signal the need for the unit to be serviced and the filter elements replaced.

In accordance with one aspect of the invention, a passive dust filtering system for an inspection hatch is provided. The system comprises a filter containment unit, an adapter section connected to the filter containment unit for attaching the filter containment unit to a hatch of a bulk storage vessel, a plurality of filter elements supported in the filter containment unit and an air purge system in the filter containment unit for removing dust from an outer surface of the filter elements.

The adapter section includes a mounting bracket for securing the filter containment unit about an open hatch of the bulk storage vessel. The mounting bracket includes a mounting flange and a gasket to provide an airtight seal between the flange and the hatch. Additionally, the mounting bracket includes a first magnetic switch to secure the mounting bracket to the bulk storage vessel around the hatch. Additional switches can be included to provide support around the mounting bracket.

The filter containment unit includes a clean air plenum above the plurality of filter elements and a panel separating the clean air plenum from an interior of the bulk storage vessel. The filter units can be secured to the separating panel. The filter elements can be cylindrical filters having a hollow interior and an open end in communication with the clean air plenum.

The filter containment unit includes a clean air vent. The vent can be in a lid or top of the containment unit.

The air purge system can include a differential pressure switch configured to measure the pressure across the filter elements. The system can also include a supply of compressed air configured to pulse air into an interior portion of each of the filter elements when the differential pressure meets a pre-selected value. A purge control circuit can be coupled to the differential pressure switch and to the supply of compressed air to initial the pulse of air into the interior of the cylindrical filter elements. The pulsed air forces any dust collected on the outside surface of the filter elements to fall off the outside surface and back into the storage vessel.

The air purge system can also include an air distribution manifold coupled to the supply of compressed air to enable pulsing air in each of the plurality of filter elements. The distribution manifold can include a plurality of diaphragm valves.

The filter containment unit can also include a dust detection sensor in the clean air plenum. The sensor can provide an indication of any dust contamination in the clean air plenum. The dust detection sensor can be coupled to an alarm to provide an indication that service is needed.

The filter containment unit can be formed to have a rectangular body portion and a top lid connected to the body portion by a hinge. The top lid can be secured in a closed position by a latch on the body portion. The filter containment unit can include one or more handles mounted to an exterior surface of the body portion.

In accordance with another aspect of the invention, a portable passive dust filtering system for a hatch of bulk storage vessel comprises a rectangular filter containment unit having a plurality of outer side walls and an interior chamber and an adapter section connected to a first end of the filter containment unit. The adapter section includes a mounting flange configured to secure the filter containment unit to a hatch of the bulk storage vessel and a plurality of magnetic switch brackets connected to the mounting flange. A lid is connected to a second end of the filter containment unit.

The system further comprises a plurality of cylindrical filter elements mounted to a plate in the interior chamber of the filter containment unit. The plate and plurality of filters define a clean air plenum on a first side of the plate.

The system also comprises an air purge system in the interior chamber of the filter containment unit having a supply of compressed air and a differential pressure switch. The system can further include a dust detection sensor in the clean air plenum of the filter containment unit.

The portable passive dust filtering system can further include one or more handles connected to an outer surface of one of the plurality of outer side walls. This helps position and remove the system from the vessel.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
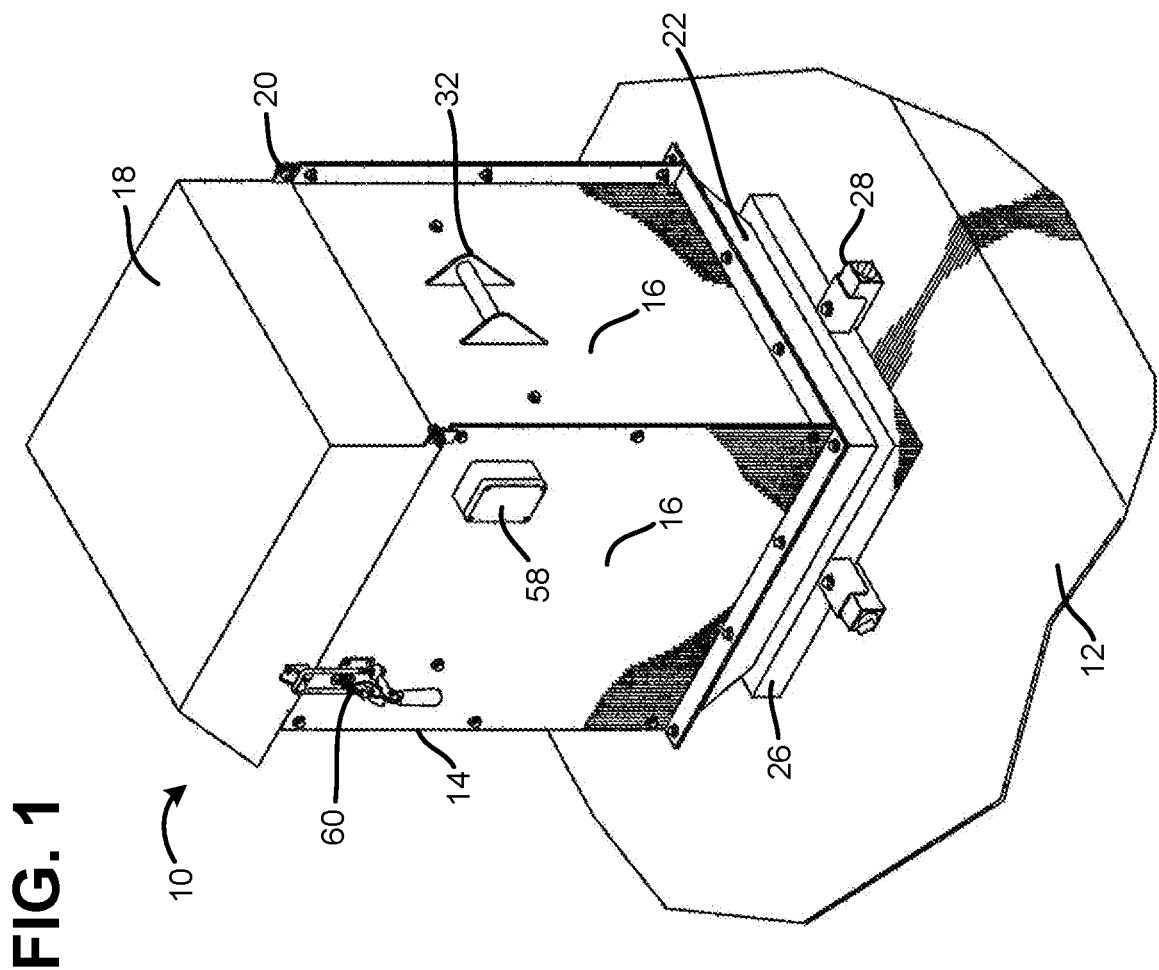
FIG. 1 is a perspective view of a dust filtering system connected to a hatch of a steel tank in accordance with an aspect of the invention.
Figure 2:
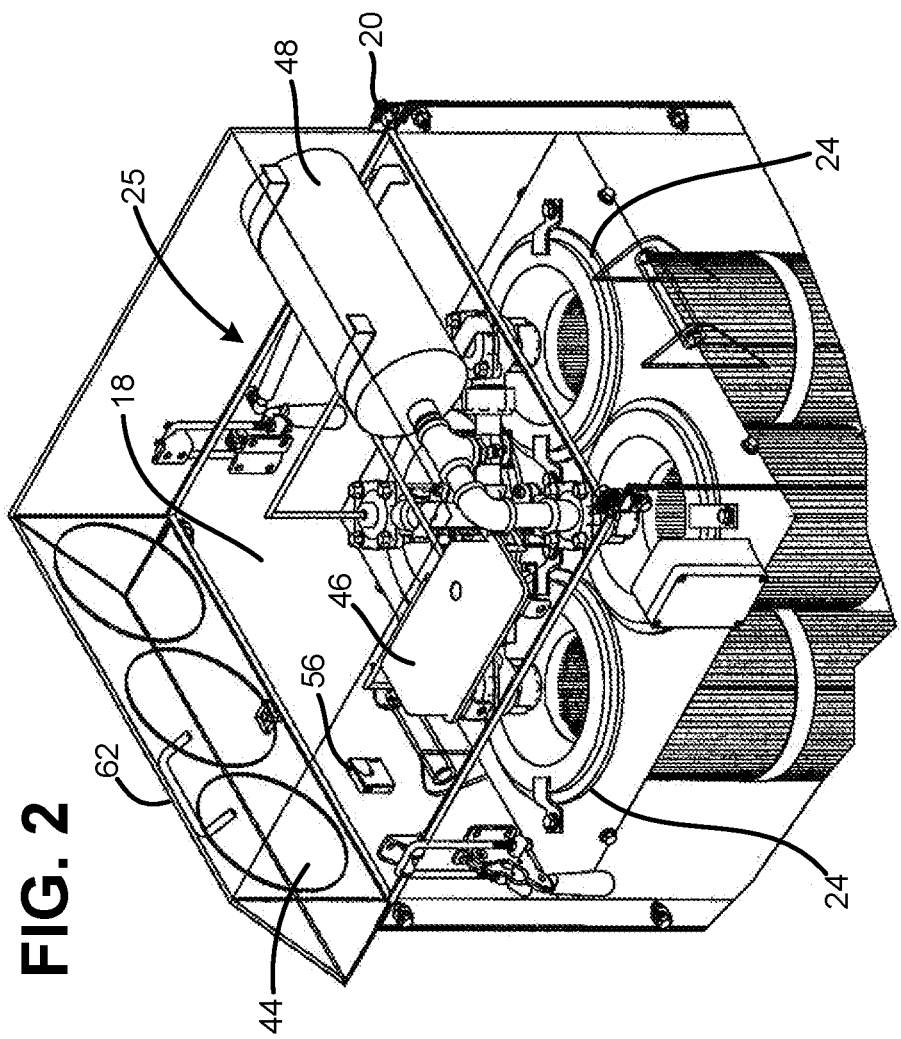
FIG. 2 is a perspective internal view of a portion of the dust filtering system of FIG. 1 (with transparent outer walls)
Figure 3:
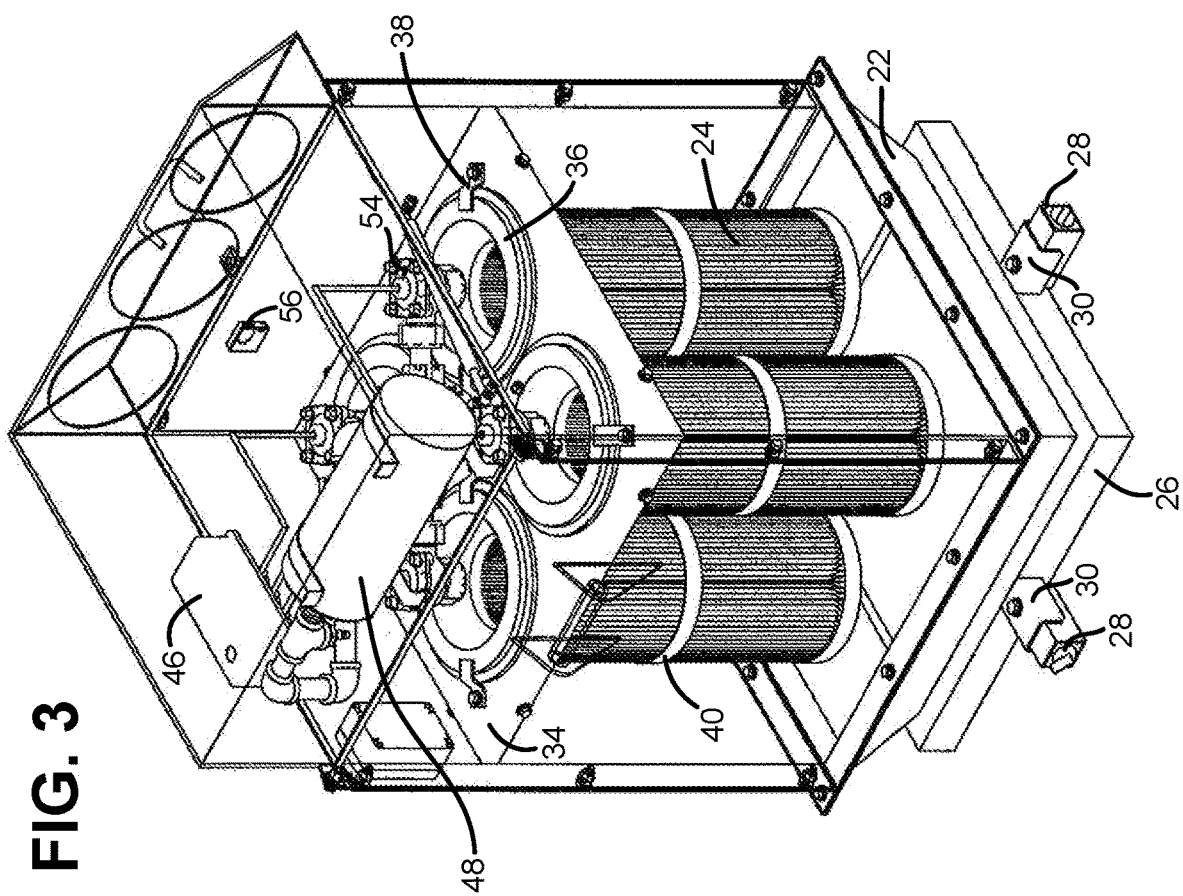
FIG. 3 is a perspective internal view of the dust filtering system of FIG. 1 from a different perspective than FIG. 1 (with transparent outer walls)
Figure 4:
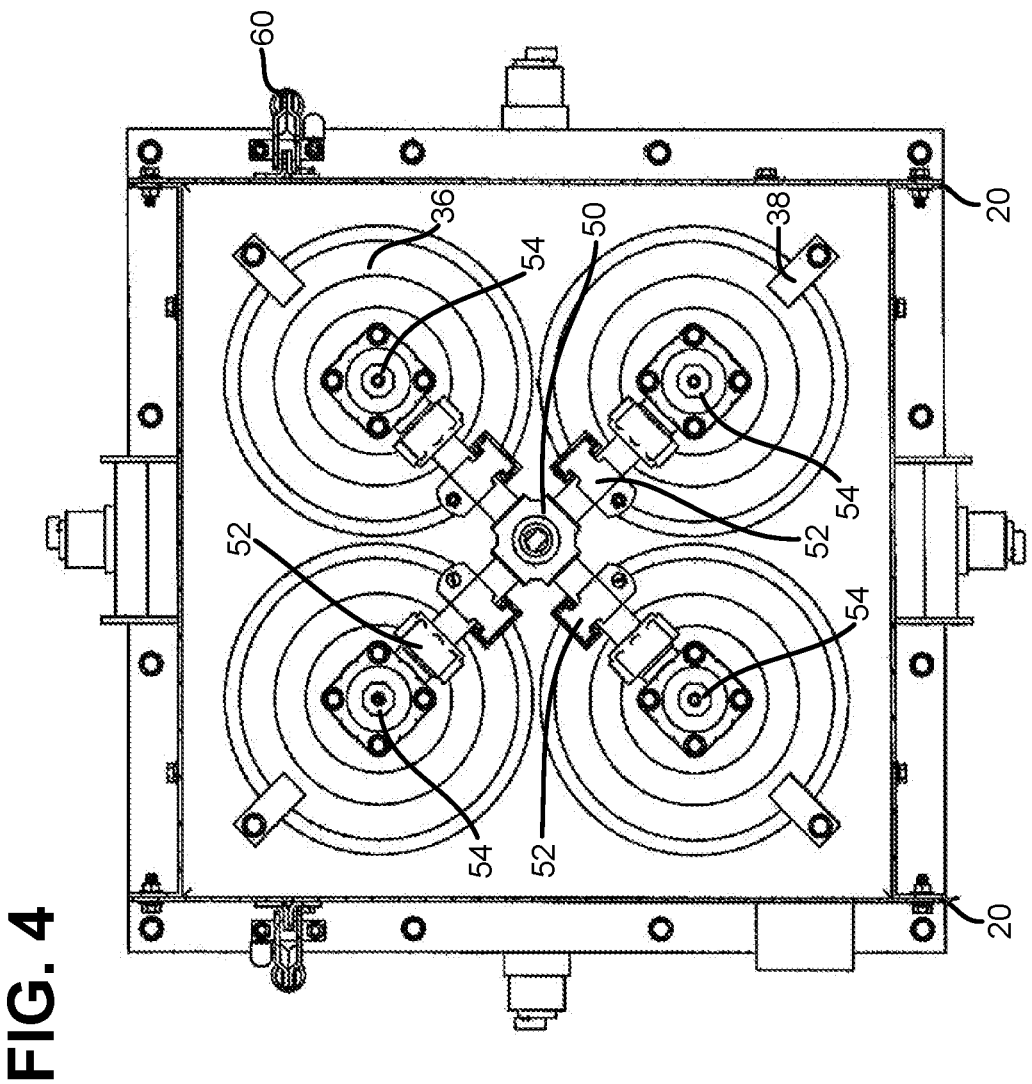
FIG. 4 is a top view of the filter elements of the dust filtering system of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-6 show the components of a passive dust filtering system 10 attached to an open hatch of a steel, dry bulk storage vessel or tank 12. As shown in FIG. 1, the system 10 includes a filter containment unit 14 having a plurality of side walls 16 and a top or lid 18 connected to the side walls 16 at an upper portion of the unit 14 by a hinge 20. The filter containment unit 14 includes an adapter section 22 for mounting the unit 14 to the tank 12. The filter containment unit 14 acts as an enclosure for a plurality of filter elements 24 and an air purge system 25 in an interior chamber of the unit 14.

The adapter section 22 includes a mounting flange 26 containing a gasket (for example, a compressible foam) for an airtight seal with the dry bulk storage tank 12. A plurality of magnetic switches 28 are connected to the mounting flange 26 by brackets 30. The magnetic switches 28 are spaced around the flange 26 and magnetically secure the containment unit 14 to the steel tank 12 when switched to an "on" position. The filter containment unit 14 can be removed from the tank 12 when the switches are turned "off." Handles 32 are provided on the outer surfaces of the side walls 16 to facilitate placement and positioning of the containment unit 14 onto and off of the tank 12.

Referring to FIGS. 2-6, each of the filter elements 24 has a cylindrical shape with one open end mounted to a separator plate 34 in the interior chamber of the filter containment unit 14. The separator plate 34 includes four openings—one for each of four filter elements 24—and spans horizontally across the interior chamber. The filter elements 24 have a closed bottom end and side walls of pleated filter material that extend upward to the open end. The open ends include an outer flange or lip that sits on the upper surface of the separator plate 34 when the remainder of the filter element is inserted into the opening in the plate 34. A hold down collar 36 and one or more hold down clips 38 keep each filter element 24 in place. One or more straps 40 keep the pleated filter material in the cylindrical shape.

The separator plate 34 and inserted filter elements 24 divide the interior chamber into a lower portion that is exposed—via an opening in the adapter section 22—to the interior of the tank 12, and an upper clean air plenum. The filter elements 24 prevent dust and other contaminants in the interior of the tank from entering the clean air plenum of the filter containment unit 14. The top 18 of the unit 14 includes a clean air vent 42 with outlets 44.

Figure 5:
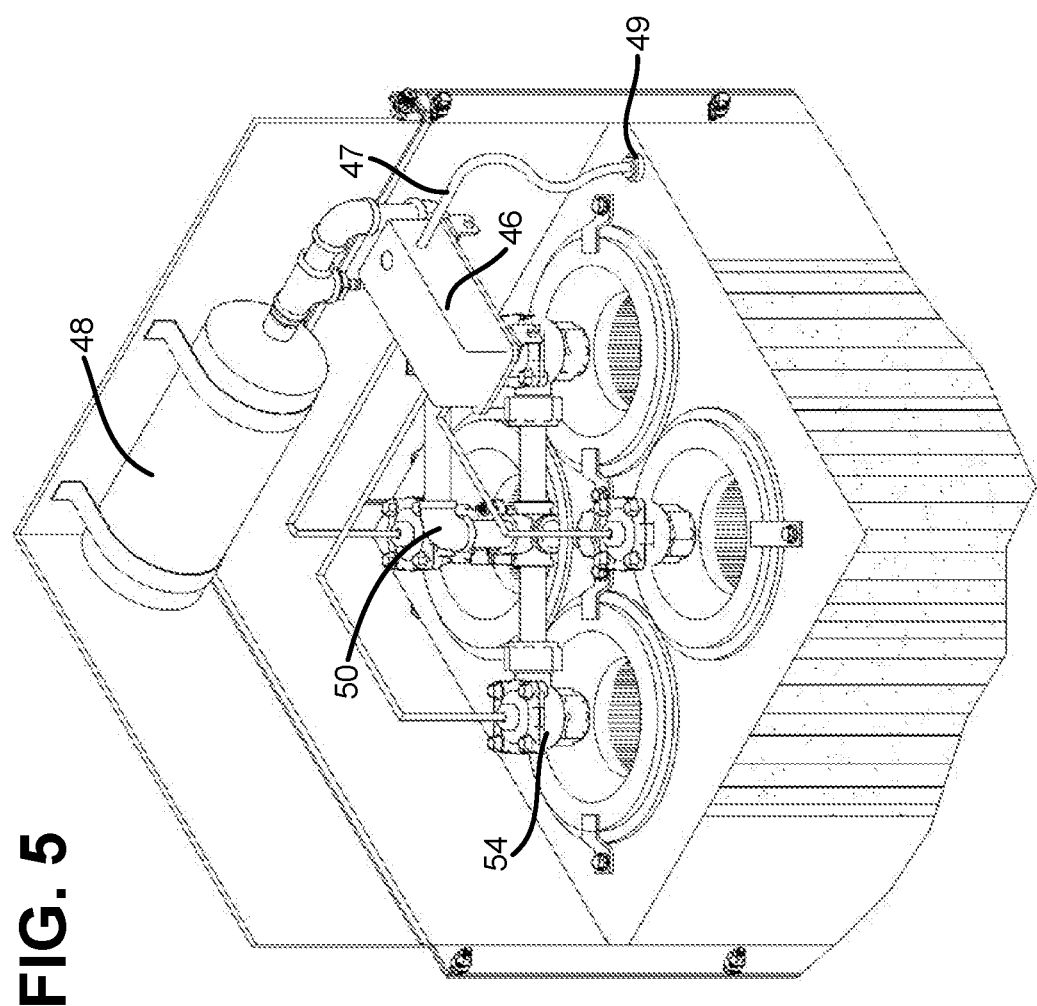
FIG. 5 is a perspective internal view of the dust filtering system of FIG. 1 illustrating the pulsed purge air components.
Figure 6:
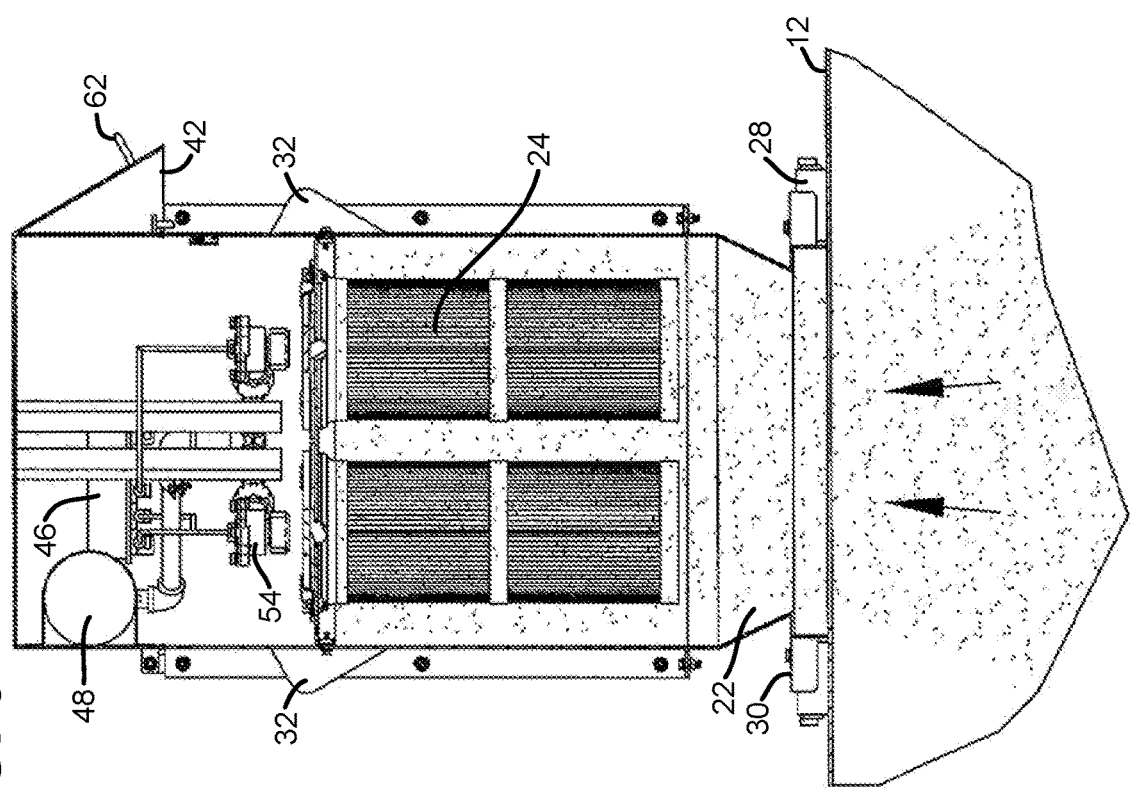
FIG. 6 is a side cross-sectional view of the dust filtering system of FIG. 1 and a portion of the steel tank; and, FIG. 7 is a side view of multiple dust filtering systems on a dry bulk storage tank.

The air purge system 25 includes a differential pressure switch set to measure the air pressure between the area of the interior chamber exposed to the interior of the bulk storage tank through the hatch, and the clean air plenum—that is, the pressure differential across the filter elements 24. When this differential pressure reaches a set point—due to buildup of dust on the outer surfaces of the filter elements 24—a purge circuit is activated. The purge circuit and pressure differential switch are positioned in a solenoid valve enclosure 46 located between a reservoir of compressed air 48 and a distribution manifold 50 in the clean air plenum. As shown in FIG. 5, a tube 47 extending from the pressure differential switch in the enclosure 46 to a bulk head 49 on the separator plate 34 provides a pressure from the dust exposed lower portion of the dust containment unit 14, which gets measured against the atmospheric pressure in the clean air plenum. The solenoid enclosure 46 can be a Goyen NEMA4 pilot valve enclosure which includes four solenoid valves.

The distribution manifold 50 includes four branches 52 that end in diaphragm valves 54 positioned directly over the open ends of each of the filter elements 24. When the circuit is activated, air from the compressed air tank 48 is pulsed into each of the filter elements 24. This forces the dust on the outer surfaces of the filter elements 24 back into the bulk material storage tank 12. All four of the filter elements 24 can be pulsed simultaneously, or they can be pulsed one at a time, or in some other combination. A capacitive discharge control circuit—which can be located in the solenoid enclosure 46—can be used to regulate the sequence, timing and duration of the pulse cycle.

The filter containment unit 14 can include a dust detection sensor 56 in the air plenum of the interior chamber. The dust detection sensor 56 can measure the presence of dust in the clean air plenum and act as a contamination indicator that verifies whether or not any of the filter elements 24 are damaged or not properly mounted in the unit 14. If the sensor 56 detects dust, an alarm can be triggered to signal the need to service the unit 14.

A control box 58 (which can hold the purge circuit and/or any other control components) can be mounted on the outer surface of one of the side walls 16 as shown in FIG. 1. Additionally, a latch 60 or other closure mechanism can be utilized to keep the lid in a closed position. A lid handle 62 can be installed on the top 18.

Figure 7:
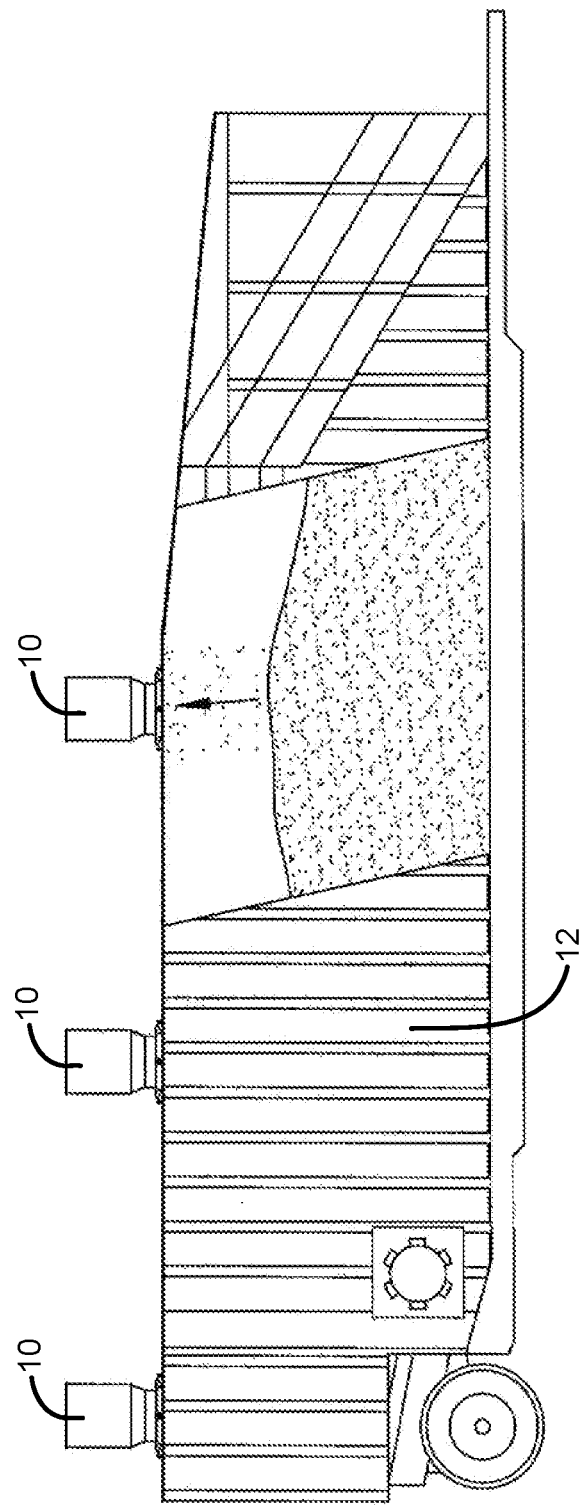

FIG. 7 shows multiple dust filtering systems 10 connected to hatches of a tank 12. The tank 12 can be part of a truck or a rail car.

As used herein, positional terms, such as top, bottom, upper, lower etc. are used with respect to describe components of the invention as shown and positioned in the Figures and are not meant to limit the invention to being in such positions.

Many modifications and variations of the present invention are possible in light of the above teachings. It is, therefore, to be understood within the scope of the appended claims the invention may be protected otherwise than as specifically described.

I claim:

1. A passive dust filtering system for an inspection hatch comprising:
   a filter containment unit;
   an adapter section connected to the filter containment unit for attaching the filter containment unit to a hatch of a bulk storage vessel;
   a plurality of filter elements supported in the filter containment unit; and,
   an air purge system in the filter containment unit for removing dust from an outer surface of the filter elements.

2. The passive dust filtering system of claim 1 wherein the adapter section includes a mounting bracket.

3. The passive dust filtering system of claim 2 wherein the mounting bracket includes a mounting flange and a gasket to provide an airtight seal between the flange and the hatch.

4. The passive dust filtering system of claim 2 wherein the mounting bracket includes a first magnetic switch to secure the mounting bracket to the bulk storage vessel around the hatch.

5. The passive dust filtering system of claim 1 wherein the filter containment unit includes a clean air plenum above the plurality of filter elements and panel separating the clean air plenum from an interior of the bulk storage vessel.

6. The passive dust filtering system of claim 5 wherein each of the plurality of filter elements is a cylindrical filter having a hollow interior and an open end in communication with the clean air plenum.

7. The passive dust filtering system of claim 5 wherein the filter containment unit includes a clean air vent.

8. The passive dust filtering system of claim 1 wherein the air purge system includes a differential pressure switch configured to measure the pressure across the filter elements and a supply of compressed air configured to pulse air into an interior portion of each of the filter elements.

9. The passive dust filtering system of claim 8 further comprising a purge control circuit coupled to the differential pressure switch and to the supply of compressed air.

10. The passive dust filtering system of claim 5 wherein the filter containment unit includes a dust detection sensor in the clean air plenum.

11. The passive dust filtering system of claim 10 wherein the dust detection sensor is coupled to an alarm.

12. The passive dust filtering system of claim 7 wherein the filter containment unit includes a rectangular body portion and a top lid connected to the body portion by a hinge.

13. The passive dust filtering system of claim 12 wherein the filter containment unit includes a handle mounted to an exterior surface of the body portion.

14. The passive dust filtering system of claim 9 wherein the air purge system includes an air distribution manifold coupled to the supply of compressed air to enable pulsing air in each of the plurality of filter elements.

15. The passive dust filtering system of claim 14 wherein the distribution manifold includes a plurality of diaphragm valves.

16. A portable passive dust filtering system for a hatch of bulk storage vessel comprising:
   a rectangular filter containment unit having a plurality of outer side walls and an interior chamber;

an adapter section connected to a first end of the filter containment unit, the adapter section including a mounting flange configured to secure the filter containment unit to a hatch of the bulk storage vessel;

a plurality of magnetic switch brackets connected to the mounting flange; and, a lid connected to a second end of the filter containment unit.

17. The portable passive dust filtering system of claim 16 further comprising a plurality of cylindrical filter elements mounted to a plate in the interior chamber of the filter containment unit wherein the plate and plurality of filters define a clean air plenum on a first side of the plate.

18. The portable passive dust filtering system of claim 17 further comprising an air purge system in the interior chamber of the filter containment unit having a supply of compressed air and a differential pressure switch.

19. The portable passive dust filtering system of claim 16 further comprising a first handle connected to an outer surface of one of the plurality of outer side walls.

20. The portable passive dust filtering system of claim 17 further comprising a dust detection sensor in the clean air plenum of the filter containment unit.

* * * * *